United States Patent [19]

Tanaka et al.

[11] Patent Number: 4,742,418
[45] Date of Patent: May 3, 1988

[54] TAPE CASSETTE WITH MEANS FOR LIMITING MOVEMENT OF REEL BRAKE

[75] Inventors: Kimio Tanaka; Haruo Shiba; Takateru Satoh, all of Nagano, Japan

[73] Assignee: TDK Corporation, Japan

[21] Appl. No.: 94,320

[22] Filed: Sep. 4, 1987

Related U.S. Application Data

[63] Continuation of Ser. No. 789,029, Oct. 18, 1985, abandoned.

[30] Foreign Application Priority Data

Oct. 20, 1984 [JP] Japan .................................. 59-158543

[51] Int. Cl.$^4$ ........................ G11B 23/02; G11B 15/32
[52] U.S. Cl. .................................... 360/132; 242/198
[58] Field of Search ................ 360/132; 242/197, 198, 242/199

[56] References Cited

U.S. PATENT DOCUMENTS 4,513,929 4/1985 Oishi et al. ............................ 360/132
4,576,345 3/1986 Koken et al. ......................... 242/198

FOREIGN PATENT DOCUMENTS 0147172 9/1982 Japan ................................... 360/132
0104774 6/1984 Japan ................................... 360/132
0203284 11/1984 Japan ................................... 360/132
2152009 7/1985 United Kingdom ................. 360/132

*Primary Examiner*—Robert S. Tupper
*Assistant Examiner*—Andrew L. Sniezek
*Attorney, Agent, or Firm*—Steinberg & Raskin

[57] ABSTRACT

A tape cassette comprises a case including upper and lower halves, each having a pair of parallel side walls and a back wall extending between the side walls, a pair of reels housed in the case on which magnetic tape is wound, and a brake member freely slidably mounted on the inner face of the lower case half, the brake member having a pair of legs which slide on the inner face of the lower case half along the side walls thereof, movable to a position wherein rotation of each of the reels is prevented. A control device is provided for limiting the movement of each of the legs of the brake member in the direction of the width of the case. The control device includes members each of which projects from a respective one of the side walls of the upper case half and is located adjacent to one face of a respective one of the legs of the control device which is opposite to the face thereof which slides on the inner face of the lower case half.

1 Claim, 5 Drawing Sheets

TAPE CASSETTE WITH MEANS FOR LIMITING MOVEMENT OF REEL BRAKE

This is a continuation, of applicatiion Ser. No. 789,029, filed 10/18/85 now abandoned.

BACKGROUND OF THE INVENTION

The present invention relates generally to audio or video tape cassettes and, more particularly, to a mechanism for controlling the position of reel brake means which slide in the tape cassette.

Audio or video tape cassettes in which reels for winding and rewinding magnetic tape are housed may be provided with means for braking the reels. The reel brake means are operative when the tape cassette is not in use, such as during transport or in other cases, to prevent the tape from becoming slackened due to the idling of the reels. The reel brake means are rendered inoperative when the tape cassette is in use to permit rotation of the reels.

The provision of reel brake means in tape cassettes has resulted in certain problems which are best understood by reference to FIGS. 1-5 which illustrate a tape cassette provided with reel brake means.

Briefly, the problems occur due to the fact that there is a certain amount of available "play" in the width direction of the cassette case for the reel brake means. Unnecessary movement of the reel brake means in the width direction, perpendicular to its intended direction of sliding movement, causes problems in the operation of the tape cassette.

In particular, a digital audio tape cassette of the tape loading type is shown in an exploded perspective view in FIG. 1. Referring to FIG. 1, an upper half 10 of the tape cassette case includes a back wall 11, side walls 12, 12 which extend parallel to each other along both sides of the upper half, and a rectangular upper plate 14. A window slit 16 is centrally located in the upper plate 14 extending in the longitudinal direction thereof and through which the amount of the tape wound around respective reels can be visually observed. The lower half 18 of the tape cassette case includes a back wall 19, side walls 20, 20 which extend parallel to each other along both sides of the lower half 18, and a rectangular lower bottom plate 22. Openings 24, 24 are symmetrically provided in the central portion of the lower bottom plate 22 through which reel drive shafts are inserted when the tape cassette is used.

The side and back walls 12, 20, 11, 19 of the upper and lower case halves 10 and 18 are substantially equal in height and a housing space is provided between the upper and lower halves 10 and 18 when the latter are assembled to each other. Winding and rewinding reels 26a and 26b are housed symmetrically with respect to each other in the central portion of the housing space and magnetic tape 30 is wound around respective reel hubs 28a and 28b. Ratchets 32a and 32b are provided at the upper end portions of hubs 28a and 28b, respectively. Liner sheets 34a and 34b are situated on respective sides of the tape-wound reels 26a and 26b to hold the latter between them to facilitate smooth conduction of the tape 30.

Reel brake means 36 are provided for braking, i.e., rotatably fixing, the reels when the tape cassette is not in use. The reel brake means 36 comprise an elongated plate member 38, a pair of parallel stoppers 40, 40 extending rearwardly from the back wall of plate member 38 toward the back wall 11 of the upper case half 10, a pair of bent sections 42, 42 extending vertically from respective ends of the plate member 38 to the inner face of the lower bottom plate 22 of the lower case half 18, and a pair of forwardly extending legs 44, 44. The plate member 38 is located between the upper case half 10 and the upper liner sheet 34a and extends parallel and adjacent to the inner face of the upper plate 14 of the upper case half 10 between the inner faces of both side walls 12, 12. The legs 44, 44 extend parallel to each other from the bottom ends of the bent sections 42, 42 in a forward direction, i.e., in a direction opposite to the direction in which the stoppers 40, 40 extend. Projections 13 extend outwardly from the front ends of legs 44, 44, the projections 13 adapted to be engaged by cooperating projections 53 provided on a lid 46 to disengage the stoppers 40, 40 from the ratchets 32a and 32b of the reels when the tape cassette is to be used as described below. A spring 45 having a central portion wound around a column 43 which projects upwardly from the center of the plate member 38 is provided to normally urge the reel brake means 36 in a reel braking direction.

A lid 46 is provided for covering the front side of a front opening 48 formed when the upper and lower case halves 10, 18 are assembled in order to prevent dust and other contaminants from entering into the reel housing space within the tape cassette case. A component of tape drive means (not shown), such as a tape deck, is inserted into the opening 48. The lid 46 includes an elongated front plate 50 having an inclined portion and side wall plates 52, 52 provided at both ends of the front plate 50. An axle 51 projects inwardly from the inner face of each of the side wall plates 52 by which the lid 46 is pivotally mounted to the tape cassette case.

A slider 54 is provided for covering the opening 48 from the bottom side of the lower case half 18 to prevent entry of dust and other contaminants. The slider 54 includes vertical side walls 56, 56 which are parallel to each other and substantially equal in height and a rectangular plate 58 extending between and interconnecting side walls 56, 56. A pair of openings 60 are symmetrically formed in the central portion of the plate 58 through which reel drive shafts are inserted. When the tape cassette is not in use, the slider 54 closes opening 48 and the reel drive shaft openings 24, 24 at the lower case half 18 are covered by a part of the slider 54. When the tape cassette is associated with drive means for use, the opening 48 is opened and the reel drive shaft openings 60 formed in slider 54 are aligned with the openings 24 formed in the lower case half 18 so that the reel drive shafts of the drive means can be inserted into the openings 60, 24.

Referring to FIG. 2 which is a plan view illustrating the tape cassette of FIG. 1 with the upper case half 10 and lid 46 removed for purposes of clarity, and FIG. 3 which is a partial plan view illustrating the relationship of the side walls 76, 78 of the lower case half 18 with the reel brake means and lid, the reel brake means 36 slide toward the front opening 48 when the lid 46 is opened as described below to thereby release the reels. A slider spring 62 has one end affixed to a column 64 which projects upwardly from the lower case half 18 and another end which is engaged with a spring receiver 66 of the slider 54 to normally urge the slider 54 forwardly to close the front opening 48. An elongated resilient piece 68 formed as part of the bottom plate 22 of the lower case half 18 serves to determine the positions of the slider 54, i.e., either in a position closing or opening the front closing 48. More specifically, a projection 79 extends from the front end of the resilient piece 68 toward the slider 54 and is adapted to engage one of the holes 72, 72 formed in plate 58 of slider 54 (FIG. 1) to determine the position of the slider 54. The resilient piece 68 is formed by separating a part of the bottom plate of the lower case half 18 and utilizes the inherent resiliency of the plastic material of which the lower case half 18 is formed.

The projections 13 formed on the legs 44 of the reel brake means 36 are adapted to be engaged by corresponding projections 53 formed on the inner face of each of the side walls 52 of lid 46 as best seen in FIG. 3. Thus, when the lid 46 is rotated about 90° to partially open the front opening 48 in the use of the tape cassette, the projections 13 are engaged by the projections 53 to cause the legs 44 and bent sections 42 of the reel brake means 36 to slide on the inner face of the bottom plate 22 of the lower case half 18 toward the front opening 48. This results in the stoppers 40, 40 which extend from the plate member 38 of the reel brake means 36 integral with legs 44, being released from the ratchets 32a and 32b of the reel hubs 28a and 28b to permit free rotation of the reels 26a and 26b. When the tape cassette is not in use, the ratchets 32a and 32b are engaged by stoppers 40, 40 under the urging of spring 45 to prevent the reels 26a and 26b from rotating.

Should a rotative force be applied to the reels which tend to wind the tape 30 around one of them when the reel brake means 36 engage the hubs, the reel brake means 36 are urged slightly in a lateral direction to follow the movement of the reel. In order to limit the lateral movement of the reel brake means 36, first side walls 76, 76 are formed on the lower case half 18 adjacent to the reel brake means 36 and outside of those portions of the lower case half 18 along which the reel brake means 36 slides. Second side walls 78, 78 are formed adjacent to the reel brake means 36 inside of those portions of the lower case half 18 along which the reel brake means 36 slides. The first and second side walls 76, 78 form passages along which the legs 44, 44 of reel brake means 36 slide and function to limit the lateral movement of the reel brake means 36. Tape guides 80, 80 project upwardly from the inner face of the bottom plate 22 of the lower case half 18 and are situated at both ends of the front opening 48. The profile of the wound tape at maximum diameter around each of the reels 26a and 26b are designated 82, 82 in FIG. 2.

Referring to FIGS. 4 and 5 which are side views in partial section of a conventional tape cassette provided with reel brake means, a partition wall 84 is provided between the front opening 48 and the inside of the lower case half 18. A spring receiver wall 86 projects upwardly from the uppe face of the partition wall 84 toward the upper case half 10 for receiving the end of the reel brake spring 45 which tends to keep the stoppers 40 engaged with the ratchets 32a, 32b.

Detector openings 88a and 88b are provided for use in detecting the end of the tape. The detector holes 88a and 88b are located in the regions of the side walls of the case which are adjacent to the side walls 52, 52 of lid 46. A prism (not shown) for bending light is housed within the case and light beams emitted from conventional apparatus provided in the drive means (not shown) enter into the upper detector holes 88a and leave the housing through the lower detector holes 88b directed by the prism. The light beam will detect the end of the tape and will initiate a subsequent operation of the reel drive, for example, stopping the same.

It will be understood that should one or both of the detector holes 88a and 88b become obstructed, the drive means will not be able to receive the detecting light beam to initiate its subsequent operation. In such a case the reels will, for example, continue rotating when the end of the tape is reached thereby possibly damaging the drive means to which the tape cassette is coupled and possibly damaging the tape cassette itself. Since the upper detector holes 88a are formed in the side walls 12, 12 of the upper case half 10, there is generally no problem with their being obstructed. However, each of the lower detector holes 88b is formed by reduced dimension portions of the side walls of the lower and upper casing halves in cooperation with each other. The legs 44 of the reel brake means 36 therefore pass adjacent to and outside the lower portions of the lower detector holes 88b. During the sliding movement of the reel brake means 36 described above, the legs 44 are limited in the extent of their movement in a direction perpendicular to the sliding direction of the reel brake means 36 and parallel to the inner face of the lower half 18, i.e., laterally, by means of the first and second side walls 76, 76 and 78, 78 of the lower case half 18. However, there is nothing to prevent the legs 44 from moving in up and down directions since the bottom face of each of the legs 44 is only in contact with the inner face of the lower case half 18. As a result, there is a large degree of "play" available to the reel brake means 36 in the up-and-down direction, i.e., in the width direction of the tape cassette case.

Additionally, it is not feasible to provide the reel brake means with a precise shape due to its structure and the reel brake means is thus likely to be lifted at its forward end during operation so that a clearance d may be produced in the vertical direction between the inner face of the bottom plate 22 of the lower case half 18 and the bottom faces of the legs 44 of the reel brake means, as best seen in FIG. 4. It therefore frequently occurs that the legs 44 of the reel brake means obstruct a part, designated 88c, of each of the lower detector holes 88b. Further, the bottom faces of the legs 44 of the reel brake means tend to be lifted by a distance 1 above the inner face of the bottom plate 22 of the lower case half 18 due to the force exerted by the reel brake spring 45, best seen in FIG. 5, so that the part 88c of the detector hole 88b that is obstructed will be closed by the leg 44. When these circumstances occur, the detector holes 88b cannot function as described above thereby making it difficult to use the tape cassette as intended.

SUMMARY OF THE INVENTION

It is the main object of the present invention to provide a new and improved tape cassette of the type described above which is capable of preventing the undesirable movement of the reel brake means as the same slides towards its non-braking position, thereby eliminating the possibility of the real brake means obstructing detector holes provided in the tape cassette case through which the tape end is detected.

Briefly, in accordance with the present invention, this object is attained by providing a tape cassette comprising a case including upper and lower case halves, each having a pair of parallel side walls and a back wall interconnecting the side walls, a pair of reels housed in the case on which magnetic tape is wound, brake means for preventing rotation of the reels, the brake means being provided with a pair of legs which slide on the inner face of the lower case half along side walls thereof, and control means for limiting the movement of each of the legs of the brake means in the direction of the width of the tape cassette case.

DESCRIPTION OF THE DRAWINGS

A more complete appreciation of the present invention and many of the attendant advantages thereof will be readily understood by reference to the following detailed description when considered in connection with the accompanying drawings in which.

DETAILED DESCRIPTION OF THE PREFERRED EMBODIMENT

Figure 1:
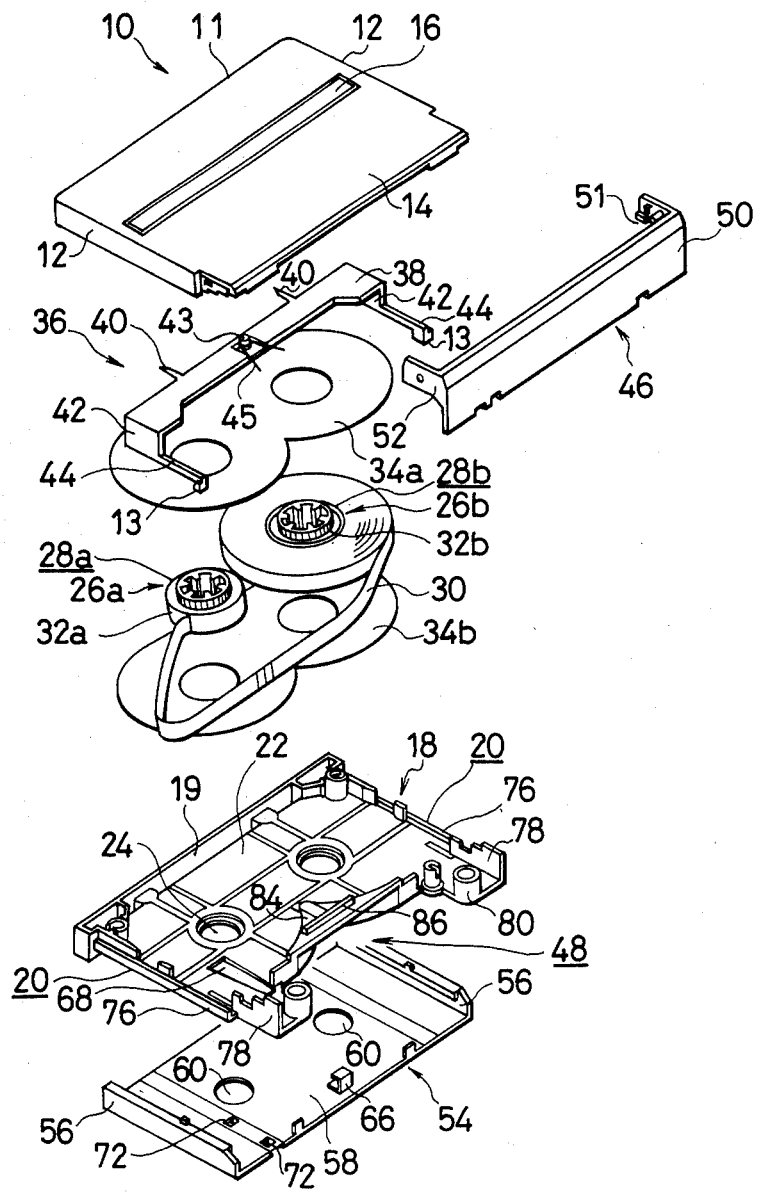
FIG. 1 is an exploded perspective view of a tape cassette.
Figure 2:
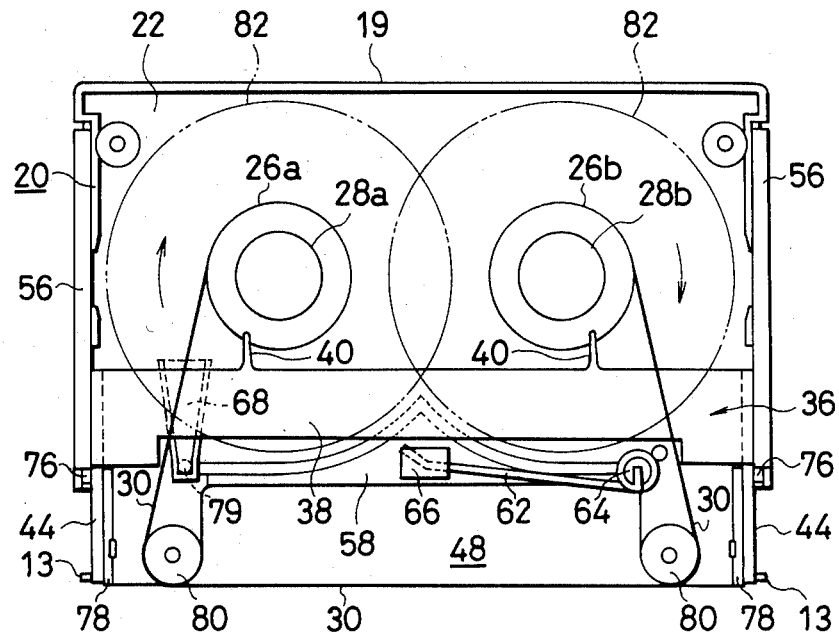
FIG. 2 is a plan view of the tape cassette shown in FIG. 1 during use with the upper case half and lid being omitted for the sake of clarity.

Referring now to the drawings wherein like reference characters designate identical or corresponding parts throughout the several views, the problems inherent in the construction of conventional tape cassettes provided with reel brake means have been described above in conjunction with FIGS. 1-5.

Figure 6:
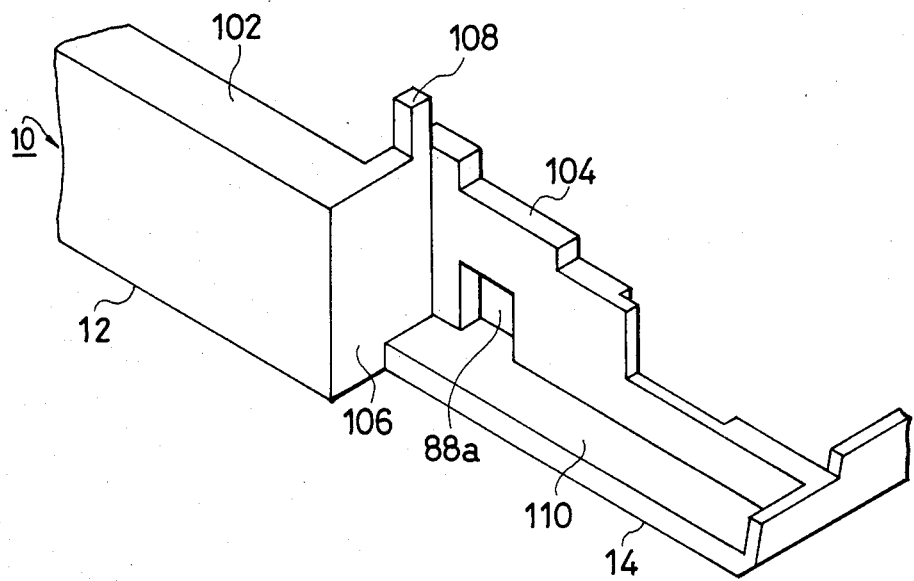
FIG. 6 is a perspective view of a portion of an upper case half for use in a tape cassette in accordance with an embodiment of the present invention, the upper case half being shown with its up side down.

Referring to FIG. 6, the side wall 12 and immediately adjacent regions thereof of an upper case half 10 for use in a tape cassette in accordance with the invention is illustrated. The upper case half is shown down side up so that the top face of the side wall 12 and the inner face of the upper plate 14 can be seen. It is noted that this configuration is the reverse of that shown in FIG. 1.

In accordance with the invention, the side wall 12 of upper case half 10 includes a main side wall 102 which extends along the direction in which the reel brake means (not shown) slides, and a subside wall 104 which extends parallel to the main side wall 102 but which is displaced inwardly thereof. A laterally extending wall 106 interconnects the main side wall 102 and sub-side wall 104. The upper detector hole 88a is formed through the sub-side wall 104. The bottom face of the sub-side wall 104 is adapted to mate with the top face of the second side wall 78 of the lower case half 18 upon assembly of the tape cassette, the respective top faces being formed so as to define the lower detector hole 88b between them. A portion of the inner face of the upper plate 14 of the upper case half 10 is designated 110. The lid 46 for opening and closing a part of the opening 48, is pivotally mounted 51 on at least a part of the second side wall 78 of the lower case half 18 and the sub-side wall 104 of the upper case half 10.

In accordance with the invention, a rectangular protrusion 108 projects from the bottom face of the connection wall 106 substantially adjacent to the sub-side wall 104. In assembly, the upper case half 10 having side walls 102 constructed in the manner shown in FIG. 6 is assembled to the lower case half 18 with the reel brake means 36 housed within the case. The bent sections 42 of the reel brake means 36 slide on the inner face of the lower case half 18 adjacent to the inner faces of the main and first side walls 102 and 76 of the upper and lower case halves 10 and 18 respectively.

The protrusion 108 is preferably formed of plastic material integrally with the upper case half 10.

Figure 7:
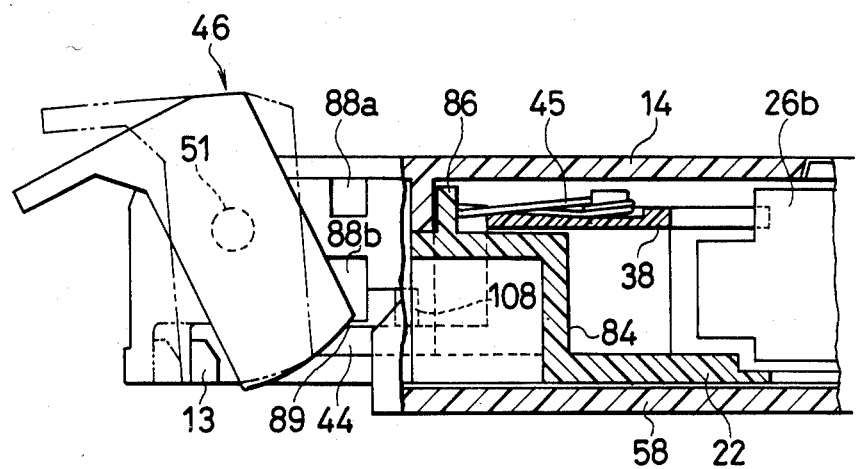
FIG. 7 is a partial side elevation view, in partial section, of an embodiment of a tape cassette in accordance with the invention utilizing the upper case half shown in FIG. 6, with the lid in a partially open position.
Figure 8:
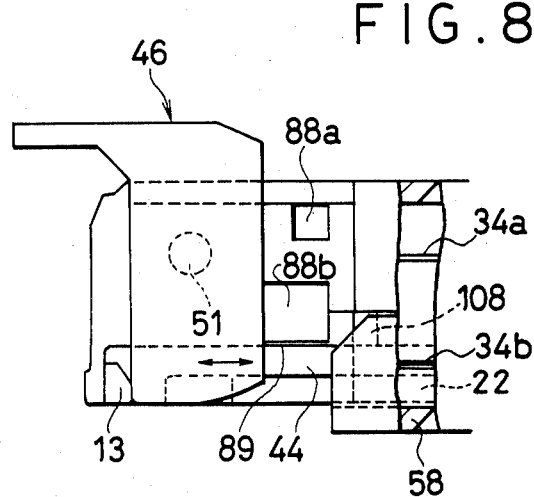
FIG. 8 is a view similar to FIG. 7 showing the lid in a fully opened position.

Referring to FIGS. 7 and 8, the protrusion 108 extending from the bottom face of the connection walls 106 of the upper case half 10 will be located adjacent to the top face of the legs 44 of the sliding reel brake means 36 which is opposite to that face of each of the legs 44 which slides on the lower case half 18. In this manner, the upward movement of the legs 44 of the reel brake means during sliding is limited by the protrusion 108 thereby preventing the formation of the clearances d and 1 shown in FIGS. 4 and 5. The bottom face of the protrusion 108 preferably lies in a plane which is situated at substantially the same level as the lower edge 89 of the lower detector hole 88b or slightly below that level as best seen in FIG. 7.

Figure 3:
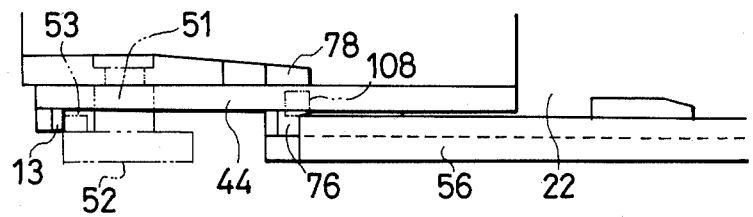
FIG. 3 is a partial plan view illustrating the relationship between the side wall of the lower case half, the reel brake means and the lid.
Figure 4:
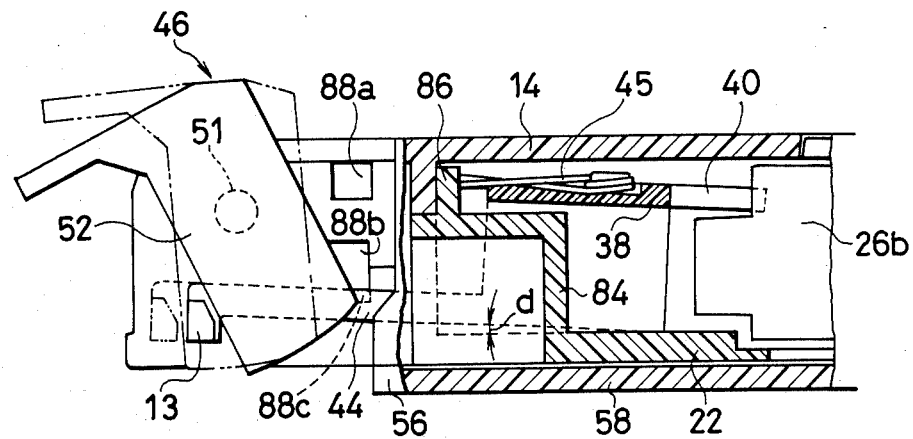
FIGS. 4 and 5 are partial side elevation views, in partial section, of a conventional tape cassette illustrating the problems described above.
Figure 5:
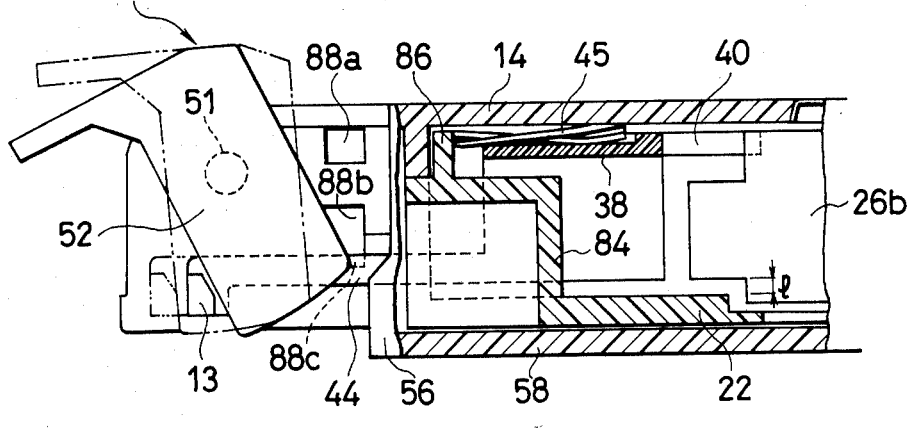

As described above, the movement of the reel brake means 36 in a direction perpendicular to its sliding direction and parallel to the inner face of the lower case half 18, i.e., in the lateral direction, is limited by the first and second side walls 76 and 78, which can be termed main and sub-side walls of the lower case half 18 (see FIG. 3). As shown in FIGS. 7 and 8, the protrusions 108 thus prevent the legs 44 of the reel brake means 36 from moving in the width direction of the case and overlapping over and partially obstructing the lower detector holes 88b which in turn prevents the obstruction of the detecting light directed through the detector holes while the reel brake means 36 slide within the tape cassette case.

Obviously, numerous modifications and variations of the present invention are possible in the light of the above teachings. It is therefore to be understood that within the scope of the claims appended hereto, the invention may be practiced otherwise than as specifically disclosed herein

What is claimed is:

1. A tape cassette comprising:
   a case including upper and lower case halves, each case half having two side walls substantially parallel to each other, and a back wall interconnecting said side walls;
   a pair of reels housed in said case around which a magnetic tape is wound;
   brake means freely slidably mounted on an inner face of said lower case half for selectively preventing rotation of said tape reels, said brake means having a pair of legs which slide on said inner face of said lower case half along said side walls thereof; and
   control means for limiting the movement of each of said legs of said reel brake means in the width direction of the case between said upper and lower case halves;
   wherein said control means include at least one protrusion formed at a part of each of said side walls of said upper case half and located substantially adjacent to a face of each of said legs which is opposite to another face thereof which slides on the lower case half;

wherein said protrusions are formed of plastic material integrally with said upper case half;

wherein said brake means include an elongated plate member adjacent said upper case half and extending substantially parallel to said back wall of said upper case half, a pair of stoppers projecting from a longitudinal back side of said plate member toward said back wall of said upper ase half to stop the rotation of each of said reels, and a pair of bent sections adjacent said respective side walls and extending from respective ends of said plate member towards said lower case half, each of said bent sections having a bottom face which slides on the inner face of said lower case half, each of said legs of said brake means extending from a lower portion of a corresponding one of said bent sections, and the faces of each of said legs and bent sections which slide on said lower case half inner face together forming a unitary continuous sliding surface relative to the lower case half;

wherein each of said side walls of said lower case half includes a first side wall situated adjacent to an outer face of a respective one of said bent sections of said brake means and a second side wall situated adjacent to an inner face of a respective one of said legs of said brake measn so that the movement of the brake means in a lateral direction perpendicular to its sliding direction and parallel to the inner face of said lower case half is limited by said first and second side walls;

wherein each of said side walls of said upper case half includes a main side wall situated adjacent to said bent section of said brake means, a sub-side walls adapted to mate with said second side wall of said lower case half, and a connection wall interconnecting said main and sub-side walls of said upper case half to each other, and wherein said protrusions are each formed at a part of a bottom face of said connection wall;

wherein said case has an opening at a front portion thereof and further including a lid for opening and closing a part of said opening, said lid being pivotally mounted on at least a part of said second side wall of said lower case half and said sub-side wall of said upper case half;

further including slider means for closing and opening a part of said opening, said slider means being freely slidably located at an outer face of said lower case half;

additionally comprising a pair of detector openings situated on a lateral side of said case, an upper opening formed in one of said sub-side walls of said upper case half and a lower detector opening formed between the same sub-side wall and a respective second wall of said lower case half;

said control means protrusions being substantially adjacent to said respective sub-side walls, with a bottom face of each said protrusion lying in a plane situated substantially at the same level as or slightly below a lower edge of said lower detector opening;

whereby said brake legs are prevented from blocking said lower detector opening; and wherein said control means constitute means for preventing a forward end of said brake legs from lifting and forming a clearance between the inner face of said lower case half and the bottom faces of said brake legs, and preventing the bottom faces of said brake legs from being lifted by a distance above the inner face of said lower case half due to force exerted by a spring urging said brake means in a reel braking direction.

* * * * *